(12) United States Patent
Amarell et al.

(10) Patent No.: US 8,506,358 B2
(45) Date of Patent: Aug. 13, 2013

(54) METHOD FOR THE OPERATION OF A GEAR OR PROFILE GRINDING MACHINE AND GEAR OR PROFILE GRINDING MACHINE

(75) Inventors: Wieland Amarell, Brattendorf (DE); Alfred Tenner, Rottmar (DE); Bernd Weiss, Roedental (DE); Friedrich Woelfel, Coburg (DE)

(73) Assignees: Kapp GmbH, Coburg (DE); Niles Werkzeugmaschinen GmbH, Berlin (DE)

( * ) Notice: Subject to any disclaimer, the term of this patent is extended or adjusted under 35 U.S.C. 154(b) by 438 days.

(21) Appl. No.: 12/895,964

(22) Filed: Oct. 1, 2010

(65) Prior Publication Data

US 2011/0081833 A1    Apr. 7, 2011

(30) Foreign Application Priority Data

Oct. 2, 2009  (DE) .................... 10 2009 048 012

(51) Int. Cl.
*B24B 1/00* (2006.01)
(52) U.S. Cl.
USPC ............ 451/11; 451/47; 451/65; 451/335; 451/331; 451/339; 409/9
(58) Field of Classification Search
USPC ............ 451/11, 65, 47, 332, 114, 914, 360, 451/262, 335, 331, 339, 334, 405, 72; 409/9, 409/8, 40, 55, 4, 37, 41, 49, 6–7, 61–62, 409/11, 38, 50; 269/21, 903; 82/122, 124, 82/129, 165
See application file for complete search history.

(56) References Cited

U.S. PATENT DOCUMENTS

| | | | | |
|---|---|---|---|---|
| 892,927 A | * | 7/1908 | Bemis ............................ | 408/45 |
| 3,659,496 A | * | 5/1972 | Bergemann et al. ........... | 409/47 |
| 3,792,633 A | * | 2/1974 | Filipiev et al. ................. | 82/124 |
| 3,818,795 A | * | 6/1974 | Upham ............................ | 409/9 |
| 4,033,076 A | * | 7/1977 | Price .............................. | 451/246 |
| 4,422,265 A | * | 12/1983 | Branston ....................... | 451/147 |
| 4,666,358 A | * | 5/1987 | Wojciechowski ........ | 414/223.01 |
| 4,680,896 A | * | 7/1987 | Breitenstein et al. ......... | 451/334 |
| 5,174,067 A | * | 12/1992 | Hasegawa et al. ............ | 451/291 |

(Continued)

FOREIGN PATENT DOCUMENTS

| | | |
|---|---|---|
| DE | 296 17 120 | 2/1997 |
| DE | 20 2006 002878 | 4/2006 |
| EP | 1 146 983 | 10/2001 |
| WO | 2006/010709 | 2/2006 |

*Primary Examiner* — George Nguyen
(74) *Attorney, Agent, or Firm* — Lucas & Mercanti, LLP (57) ABSTRACT

The invention relates to a method for the operation of a gear or profile grinding machine (1) for the grinding of pre-geared or pre-profiled workpieces (2), wherein the machine comprises at least one tool spindle (3) which can carry at least one grinding tool (4) and wherein the machine comprises at least two workpiece spindles (5, 6) which can at least temporarily be driven to the tool spindle (3) for cooperation of the workpiece (2) with the grinding tool (4). To improve the ratio between primary processing time and secondary processing time the invention proposes that the at least two workpiece spindles (5, 6) are pivoted around a respective axis of rotation (7, 8) for transportation from a grinding position (I) to a loading station (II) and vice versa, wherein the rotation of the two workpiece spindles (5, 6) takes place independently from another. Furthermore, the invention relates to a gear or profile grinding machine.

10 Claims, 6 Drawing Sheets

(56) References Cited

U.S. PATENT DOCUMENTS

| | | | |
|---|---|---|---|
| 5,333,413 A * | 8/1994 | Hashimoto | 451/9 |
| 5,595,528 A * | 1/1997 | Becker | 451/72 |
| 5,899,645 A * | 5/1999 | Garschagen et al. | 409/9 |
| 6,000,305 A * | 12/1999 | Link | 82/129 |
| 6,158,312 A * | 12/2000 | Link et al. | 82/122 |
| 6,286,402 B2 * | 9/2001 | Crudgington et al. | 82/1.11 |
| 6,298,759 B1 * | 10/2001 | Herrscher et al. | 82/129 |
| 6,752,691 B1 * | 6/2004 | Jakoby et al. | 451/6 |
| 7,004,815 B2 * | 2/2006 | Jeong | 451/8 |
| 7,241,203 B1 * | 7/2007 | Chen et al. | 451/11 |
| 2002/0197121 A1 | 12/2002 | Mall | |
| 2004/0001750 A1 * | 1/2004 | Kremerman | 414/744.1 |
| 2005/0217053 A1 * | 10/2005 | Kim et al. | 15/250.21 |
| 2007/0060022 A1 * | 3/2007 | Wirz et al. | 451/5 |
| 2012/0245005 A1 * | 9/2012 | Sharma et al. | 483/1 |

* cited by examiner

METHOD FOR THE OPERATION OF A GEAR OR PROFILE GRINDING MACHINE AND GEAR OR PROFILE GRINDING MACHINE

This application claims the priority of DE 10 2009 048 012.9 filed Oct. 2, 2009 which is incorporated by reference herein.

The invention relates to a method for the operation of a gear or profile grinding machine for the grinding of pre-geared or pre-profiled workpieces, wherein the machine comprises at least one tool spindle which can carry at least one grinding tool and wherein the machine comprises at least two workpiece spindles which can at least temporarily be driven to the tool spindle for cooperation of the workpiece with the grinding tool. Furthermore, the invention relates to a gear or profile grinding machine.

Especially in the production of gears the final grinding process has a major relevance. During this process the flanks of the tooth are machined by a grinding operation to bring them to the exact contour. An effective method for the production of a gear is the method of generative grinding by means of a grinding worm or the profile grinding with a profile grinding tool.

In the case of workpieces especially with small gearings (tip circle diameter till ca. 200 mm) the primary processing time is relatively short compared with the secondary processing time. Due to the relatively short primary processing time machines and grinding methods are necessary for an economical manufacturing process which provides an improved ratio between primary processing time and secondary processing time. This is especially true if additionally also the lot size of the work pieces drops—as a consequence of a growing product variety. So, the reduction of the setup time becomes a raising importance.

A method and a corresponding gear grinding machine respectively of the kind mentioned above are known from EP 1 146 983 B1. Here, a rotary indexing table is equipped with two workpiece spindles. By rotation of the rotary indexing table by 180° a workpiece being clamped in a loading and/or unloading station can be driven to a grinding tool while simultaneously a finished workpiece is driven to the loading and/or unloading station. By this solution it is already possible to obtain a relatively well relation between primary processing time and secondary processing time, because parallel to the grinding of a workpiece a clamping an alignment of the next workpiece can take place.

However, the relation between primary processing time and secondary processing time which can be reached with the pre-known method and with the pre-known grinding machine respectively is still not satisfactory.

Thus, it is an object of the present invention to further develop a method and a grinding machine according to the kind mentioned above so that it becomes possible to obtain a further improved relation between primary processing time and secondary processing time. Accordingly, the method and the machine respectively should have a further improved economical mode of operation. Also, the part of the setup time in relation to the primary processing time should be as small as possible, to reach the mentioned aim.

The solution of this object by the invention is characterized in that the at least two workpiece spindles are pivoted around a respective axis of rotation for transportation from a grinding position to a loading station and vice versa, wherein the rotation of the two workpiece spindles takes place independently from another.

Thereby, the two axes of rotation are preferably arranged vertically.

Furthermore, according to a preferred embodiment the two axes of rotation are arranged parallel and in a distance to another. In this case it is preferred that for rotation of the workpiece spindles from the grinding position into the loading station and vice versa the same are rotated around the respective axis of rotation by an angle between 180° and 240°, preferably between 200° and 230°.

Furthermore, it is also possible that the two axes of rotation are arranged concentrically. In this case a preferred embodiment of the invention proposes that for rotation of the workpiece spindles from the grinding position into the loading station and vice versa the same are rotated around the respective axis of rotation by an angle between 180° and 360°, preferably between 180° and 270°. The rotation around an angle of ca. 270° allows a very beneficial mode of operation: Several peripheral devices, which are discussed in more detail later on (e.g. a centrifuge station, a SPS station etc.), can then be arranged only once for both pivotable workpiece spindles and can be used by both of them.

The gear or profile grinding machine, which comprises at least one tool spindle which can carry at least one grinding tool and which comprises at least two workpiece spindles which can at least temporarily be driven to the tool spindle for cooperation of the workpiece with the grinding tool is characterized in that the at least two workpiece spindles are arranged pivotable around a respective axis of rotation for transportation from a grinding position to a loading station and vice versa, wherein the machine is designed for an independent rotation of the two workpiece spindles.

The two axes of rotation can be arranged vertically; furthermore, they can be arranged parallel and in a distance to another. Thereby, the workpiece spindles can depict circular arcs during their rotation around the axis of rotation, wherein the tool spindle is arranged in the area of one of the intersection points of the two circular arcs; in the area of the other intersection point of the circular arcs a loading and/or unloading station for the workpieces can be arranged.

An alternative embodiment proposes that the two axes of rotation of the two workpiece spindles are arranged concentrically.

In the area of the tool spindle a counter support can be arranged stationary on or at a machine bed. This counter support can be used by both workpiece spindles.

Also, further peripheral devices can be arranged:

An alignment device for the workpiece can be arranged stationary at a position along the circular arc on or at the machine bed.

Furthermore, at one of the two workpiece spindles a dressing device for the grinding tool can be arranged which can be rotated together with the workpiece spindles. By this device, the grinding tool can be dresses if necessary by rotating the respective workpiece spindle with the dressing device into the grinding position.

Furthermore, a centrifuge station for the workpiece can be arranged stationary at a position along the circular arc on or at the machine bed.

A clamping device changing station can be arranged stationary at a further position along the circular arc on or at the machine bed. Furthermore, a workpiece depositing station can be arranged at a position along the circular arc on or at the machine bed. A preferred embodiment proposes that the clamping device changing station and the workpiece depositing station respectively comprise a rotary indexing table with at least two deposition places. Here, the clamping device changing station and the workpiece depositing station are preferably designed as a combined unit.

Finally, in the area of the tool spindle a grinding tool changing station can be arranged stationary on or at the machine bed.

Preferably, workpieces with small gearings are finished with the proposed gear or profile grinding machine, preferably workpieces which have a maximum tip circle diameter till ca. 200 mm; also the invention proposal is suitable specially for short shaft parts, where appropriate with several gearings. The invention proposal is especially useful for gearings and special profiles in volume production.

The proposed machine concept can also be denoted as "pick up" concept, wherein the workpieces are taken onto a workpiece spindle at a loading station and are rotated to the grinding station independently from a further workpiece spindle.

With this concept the secondary processing time can be optimized (minimized) and setup processes and automation functions can be integrated. The loading and unloading of the workpiece spindles with workpieces, the clamping, the alignment (centering) of the gearing, the acceleration and the deceleration as well as the centrifuging of the workpieces can be realized parallel to the grinding on the other workpiece spindle.

Consequently, the proposed concept allows also a significant improvement with respect to the setup times.

In the drawing embodiments of the invention are shown.

Figure 1:
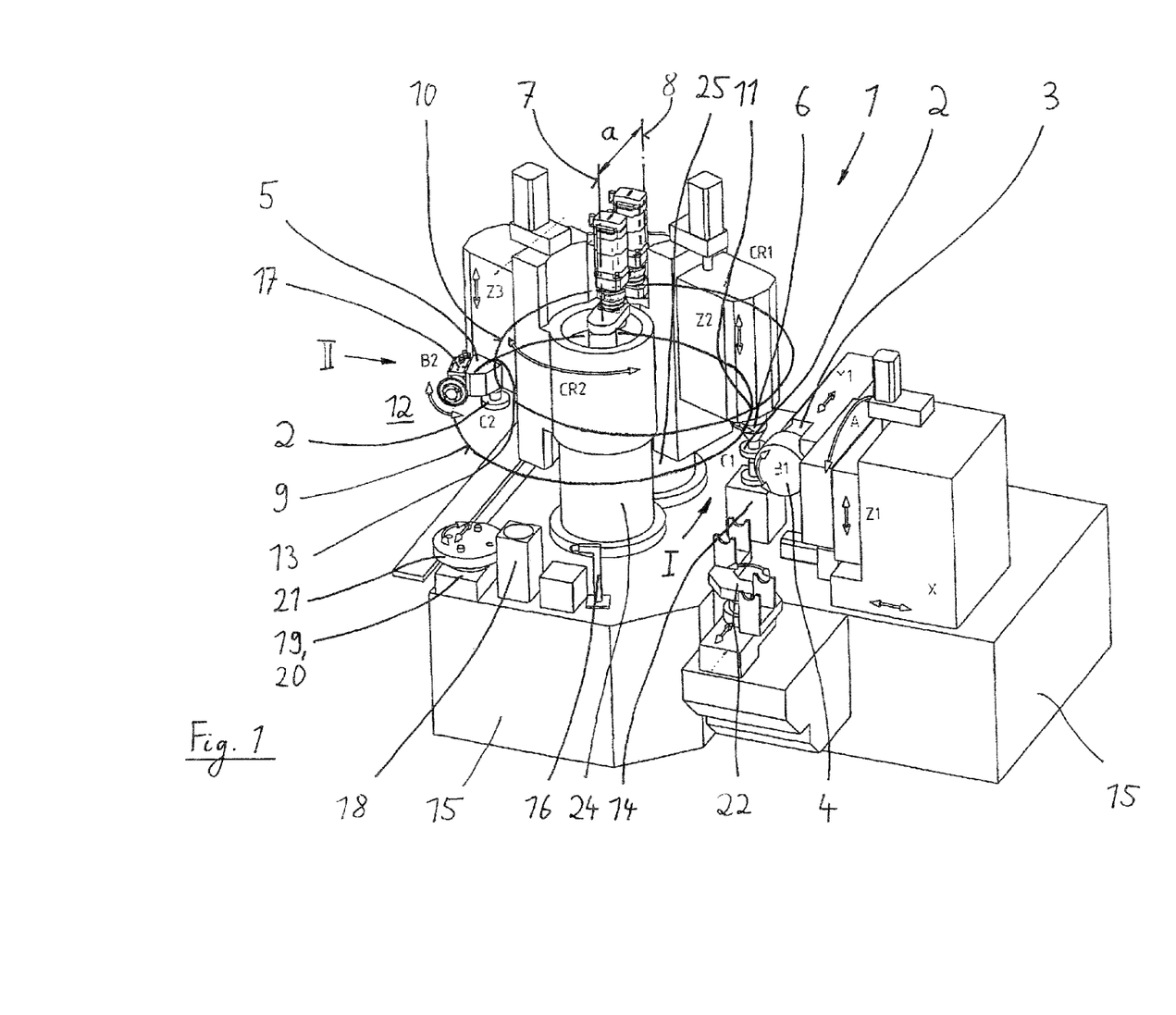
FIG. 1 shows in a perspective view a gear grinding machine with two columns, wherein two workpiece spindles can be rotated around the columns to move the workpiece spindles from a loading and unloading station to a grinding position and vice versa.
Figure 2:
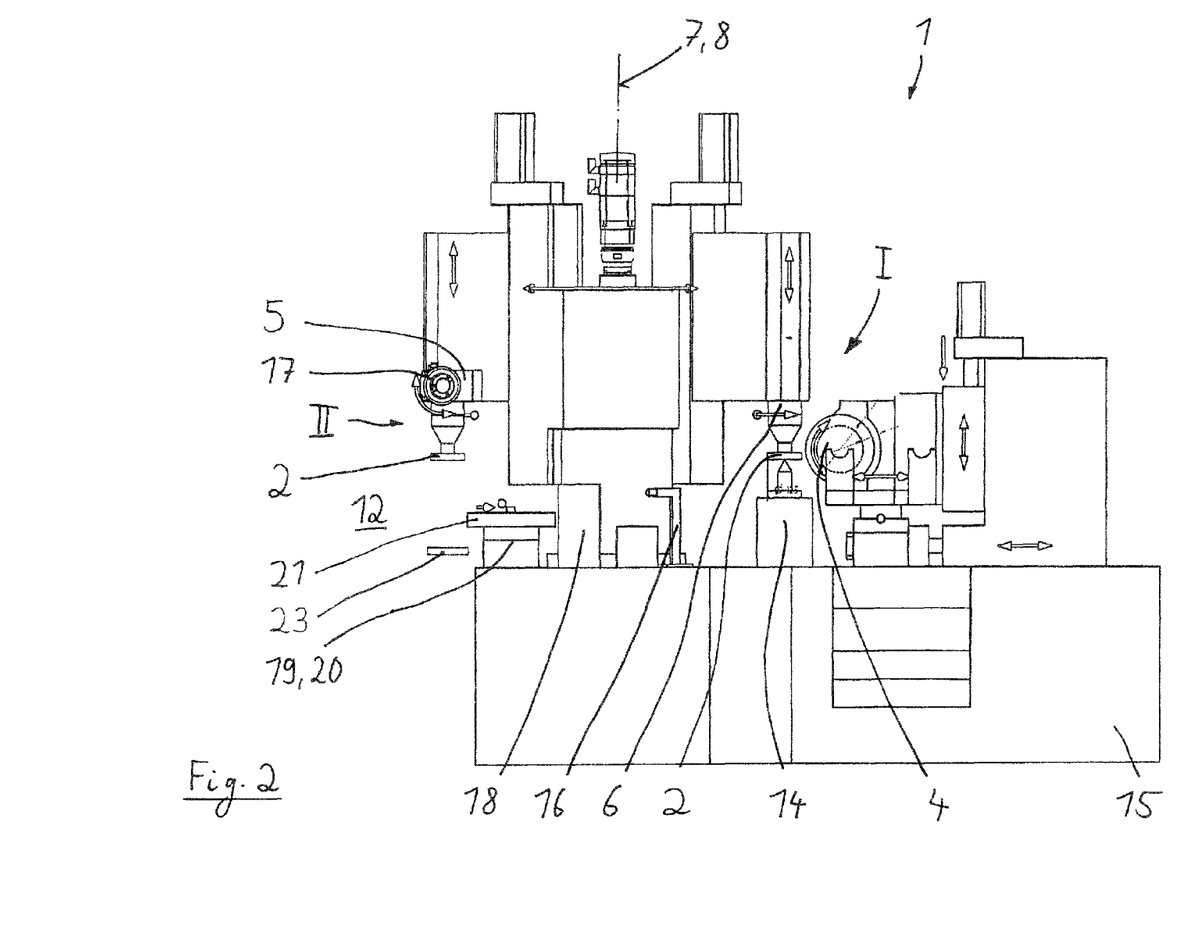
FIG. 2 shows the corresponding front view to FIG. 1
Figure 3:
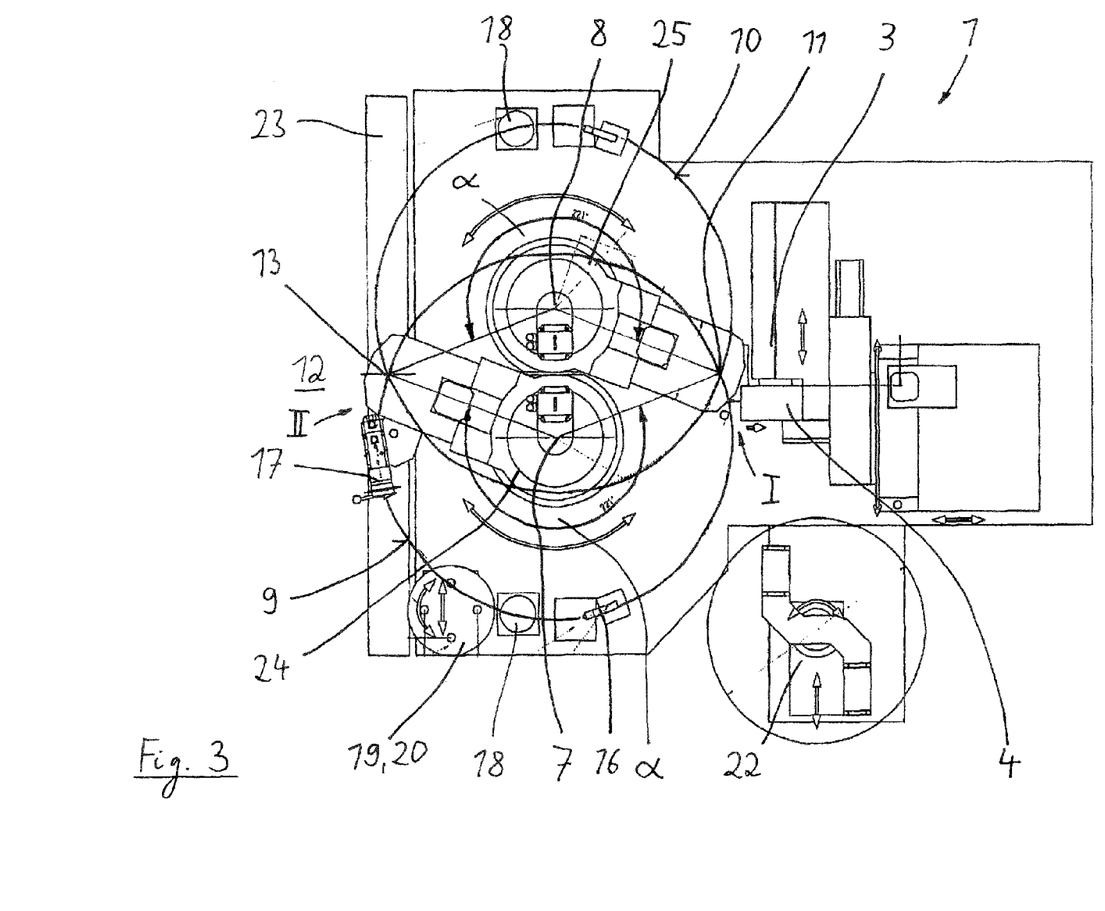
FIG. 3 shows the corresponding top plan view to FIG. 1.

In FIGS. 1 till 3 a gear grinding machine 1 is shown in a first embodiment. The machine 1 has a machine bed 15 on which at first the usual elements are arranged to perform a gear grinding operation. So, the machine 1 has especially a tool spindle 3 with a grinding tool 4 (grinding disk or grinding worm, as the case may be also several grinding tools which follow in axial direction for rough and finish machining) which is arranged on a movable guide in that way that it can perform the movements which are necessary for the grinding process. In the figures the provided directions of movement are denoted with double arrows. However, this is not further discussed as those axes are usual.

However, it is not typically for a gear grinding machine that two workpiece spindles 5 and 6 are provided, which workpiece spindles 5, 6 are each designed for carrying a workpiece 2. The two workpiece spindles 5, 6 are arranged at columnar guides 24 and 25 in that way, so that they can be rotated around two vertical axes of rotation 7 and 8. The two axes of rotation 7, 8 are arranged in a distance "a" (see FIG. 1). The rotation can take place to move a workpiece 2, which is clamped on one of the workpiece spindles 5, 6, from a first grinding position I to a loading position II and vice versa from the position II to the position I.

Thus, it is provided that the two workpiece spindles 5, 6 are rotated around the respective axis of rotation 7, 8 for bringing them from the grinding position I to the loading position II and vice versa. Thereby, it is essential that the rotation of the two workpiece spindles 5, 6 takes place independently from another.

Consequently, the workpieces 2 and the workpiece spindles 5 and 6 respectively which hold the workpieces 2 depict circular arcs 9 and 10 during the rotation between the positions I and II. Due to the distance "a" two intersection points of the circular arcs result which are denoted with 11 and 13. The intersection point 11 which is facing the grinding tool 4 is the location where the workpiece spindle 5 or 6 including workpiece 2 is positioned when the workpiece 2 is machined in the grinding position I. Meanwhile, at the other intersection point 13 a loading and unloading station 12 is arranged where the loading and unloading of the workpiece spindle 5, 6 with or from workpieces 2 takes place with a manipulator system which is not depicted. The workpieces 2 are transported in the present embodiment by means of a belt (conveyor belt) 23 to and from the machine. Of course, also any other kind of the supply and transport of workpieces 2 is possible, e.g. a loading cell.

The rotation of the workpiece spindles 5, 6 including workpieces 2 takes place in the present embodiment by rotating the workpiece spindles 5, 6 around the axes of rotation 7, 8 by an angle α (see FIG. 3) back and forth which is here ca. 220°.

In the grinding position I a counter support 14 is arranged in the area of the intersection point 11 (optionally) which is arranged stationary on the machine bed 15. The counter support is used by both workpiece spindles 5, 6 during the grinding operation.

It is the significant advantage of the proposed concept that due to the independent rotational movement of the two workpiece spindles 5, 6 the primary processing time for the grinding of a workpieces on a workpiece spindle 5, 6 can be utilized in an optimized way, while simultaneously on the other workpiece spindle the different process steps are carried out which are necessary or desirable and which are relevant with respect to the secondary processing time.

Consequently, different devices are arranged along the circular arcs 9, 10 which are passed by the workpiece spindles 5, 6 and the workpiece 2 respectively during the rotation from the grinding position I to the loading position II and vice versa, wherein the necessary or desirable provisions can be carried out by those devices.

At first an alignment device 16 has to be mentioned which is employed to align and to center respectively the clamped workpiece 2 on the workpiece spindle 5, 6, so that the grinding tool 4 can enter without any collision into the tooth gaps during the following grinding process. One alignment device 16 is arranged stationary on the machine bed 15 at each circular arc. When using pre-known machines a manually adjustment of the alignment device 16 for the specific workpiece outer diameter is necessary. This is not the case for the proposed design, i.e. this can be omitted beneficially.

The process is improved by preferred but only optional further elements:

Initially, one centrifuge station 18 can be further arranged at each circular arc. Here, remaining lubricant which adheres at the workpieces 2 can be centrifuged. Due to the "pick up" concept "passive" centrifuge stations are realizable. Special claw systems for specific types of parts are not necessary, the device works quasi free from setup times. Usually a driven centrifuge station is employed, i.e. the centrifuge has a rotational drive for the workpieces to be centrifuged. However, in the "passive" centrifuge station the rotational movement of the workpiece spindle is used for centrifuging. Thus, the centrifuge station is merely e.g. a container which is open at its top side in which the workpiece clamped on the workpiece spindle is brought and then rotated by means of the workpiece drive for centrifuging. A change of the clamping of the workpiece from the workpiece spindle into an "active" centrifuge station can be omitted.

Furthermore, a clamping device changing station 19 can be provided which is combined with a station 20 for depositing a workpiece 2 in the present case. The combined unit 19/20 is equipped with a rotary indexing table 21 which provides at least two deposition places. For an automated change of the clamping device two changing stations are provided. The clamping device which is actually used is deposited at an empty station, the new clamping device is taken subsequently from a further station where it is stored. The deposition as well as the taking of the clamping device takes place automated with respective manipulation elements which are not shown but pre-known as such.

For the export of SPC parts (measurement parts) and of defective parts the machine has also the already mentioned rotary indexing table 21 at its disposal, which—as said—has at least two deposition places. This function is provided in pre-known solutions usually outside of the machine what leads to complex automatization devices. Accordingly, this function can be realized with the proposal according to the invention in a very much easier way.

Of course, also further stations can be installed along the swivel path of the workpiece spindles 5, 6 which further increase the functionality.

An automated tool change becomes possible by a grinding tool changing station 22 which is positioned near the tool spindle 3. Here, two changing places are available. Firstly, the grinding tool 4 which is actually used can be deposited at an empty place. Subsequently, the new tool is taken from the second place and arranged on the tool spindle 3. The deposition and the grabbing takes place in an automated process.

If dressable grinding tools 4 (grinding disks or grinding worms) are used—what can be done optionally—it can be beneficial to further provide that a dressing device 17 is arranged on one of the workpiece spindles (in the shown embodiment on the workpiece spindle 5). So, it becomes possible to move the dressing device 17 into the position I for dressing the grinding tool 4.

It is not depicted but of course also possible to exchange grinding tools which have been dressed outside the machine 1 especially by means of the grinding toll changing station 22. By doing so a further saving of secondary processing time is possible compared with a dressing in the machine.

Figure 4:
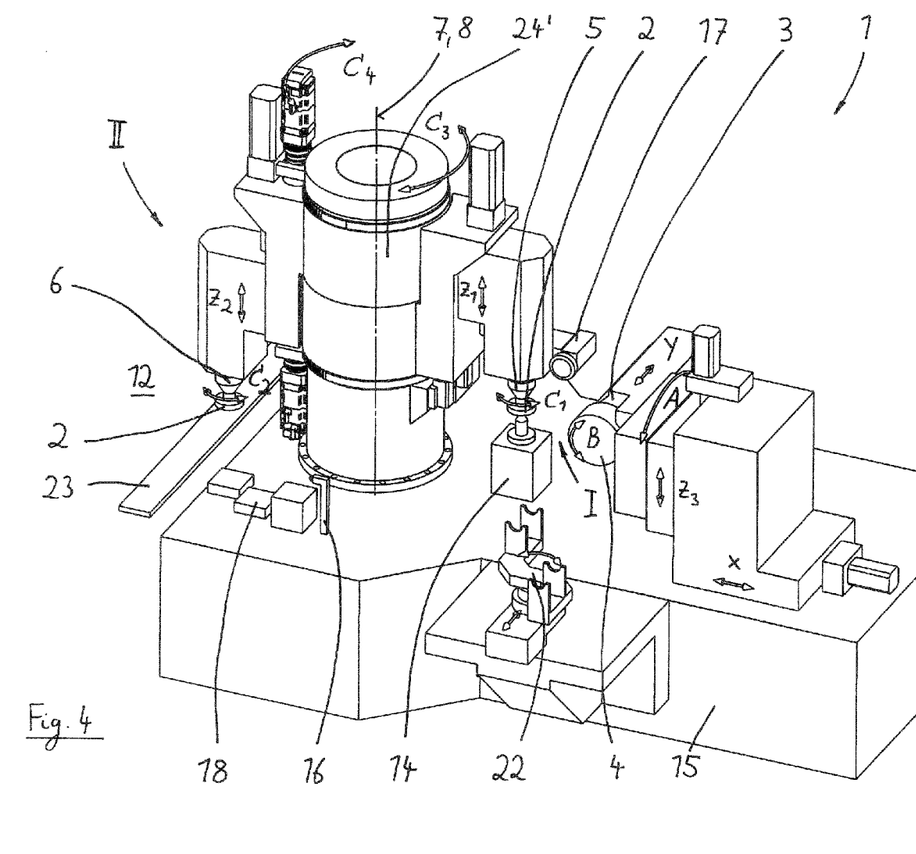
FIG. 4 shows in a perspective view a gear grinding machine in an alternative embodiment to FIG. 1.

In FIGS. 4 till 6 an alternative embodiment of the grinding machine 1 according to the invention is shown. The only difference is here that the two axes of rotation 7 and 8 are concentrically, i.e. the distance "a" (see FIG. 1) is zero.

Figure 5:
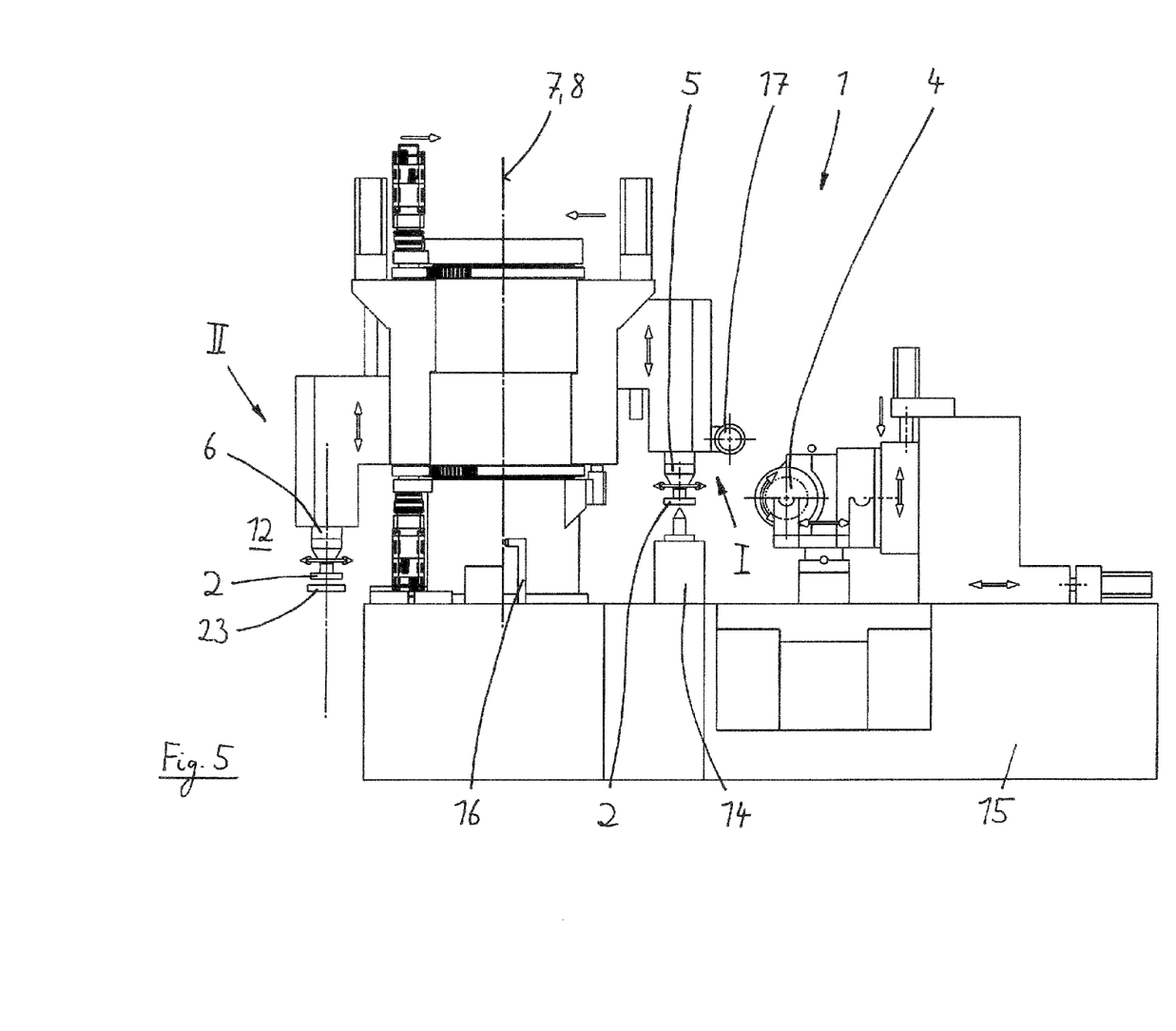
FIG. 5 shows the corresponding front view to FIG. 4
Figure 6:
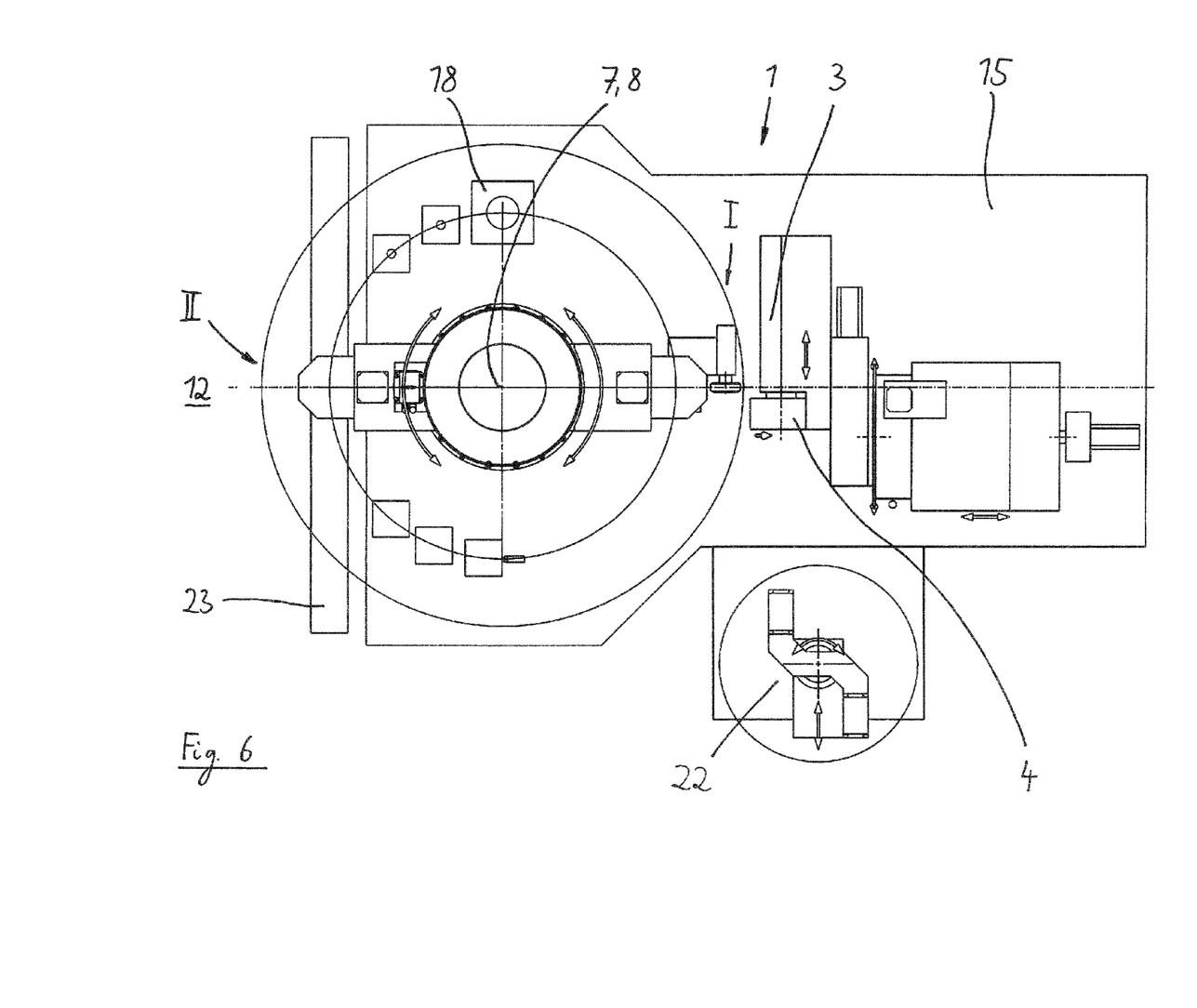
FIG. 6 shows the corresponding top plan view to FIG. 4.

Accordingly, only one columnar guide 24' is arranged which is divided seen in the direction of the axes of rotation 7, 8: The upper part rotates the workpiece spindle 5, the lower part rotates the workpiece spindle 6. Accordingly, a more space saving design in terms of the width of the machine can here be realized.

However, what all concepts have in common is that an independent rotation of the two workpiece spindles 5, 6 is possible. Accordingly, during the grinding of a workpiece 2 in the grinding position I the other workpiece spindle can be rotated totally independent so that the respective mentioned stations from the loading and unloading till the alignment of the workpiece 2 can be approached simultaneously to the primary processing time. By doing so the flexibility is increased correspondingly.

Overall, the ratio between primary processing time and secondary processing time can be optimized and the profitability of the grinding of gears and profiles can be increased.

A variant of the described machine concept is the use of only one axis of rotation for only one workpiece spindle; thus the second axis of rotation with the second workpiece spindle is omitted. This machine concept is thus similar to that one as shown in FIG. 4, but just with a single workpiece spindle 5 on a columnar guide 24'. Here, the workpiece spindle 5 is employed which also carries the dressing device 17.

With such a solution it becomes possible to use significant advantages of the described solution according to the invention, wherein of course not the full time advantage for the simultaneous run of primary and secondary processing times can be obtained. Thus, higher process times result when only one workpiece spindle on one axis of rotation at one column is used. However, small series with small lots and with a higher variance of parts respectively can be produced in an economical manner. Compared with pre-known machine concepts advantages in the setup can be obtained.

| | List of Reference Numerals: |
|---|---|
| 1 | Gear- or Profile Grinding Machine |
| 2 | Workpiece |
| 3 | Tool Spindle |
| 4 | Grinding Tool |
| 5 | Workpiece Spindle |
| 6 | Workpiece Spindle |
| 7 | Axis of Rotation |
| 8 | Axis of Rotation |
| 9 | Circular Arc |
| 10 | Circular Arc |
| 11 | Intersection Point |
| 12 | Loading and/or Unloading Station |
| 13 | Intersection Point |
| 14 | Counter Support |
| 15 | Machine Bed |
| 16 | Alignment Device |
| 17 | Dressing Device |
| 18 | Centrifuge Station |
| 19 | Clamping Device Changing Station |
| 20 | Workpiece Depositing Station |
| 21 | Rotary Indexing Table |
| 22 | Grinding Tool Changing Station |
| 23 | Conveyor Belt |
| 24 | Columnar Guide |
| 25 | Columnar Guide |
| 24' | Columnar Guide |
| I | Grinding Position |
| II | Loading Position |
| a | Distance |
| α | Angle |

The invention claimed is:

1. Method for the operation of a machine for the grinding of a workpiece, wherein the machine comprises at least one tool spindle which can carry at least one grinding tool and at least two workpiece spindles which can at least temporarily be driven to the tool spindle for cooperation of the workpiece with the grinding tool, the method comprising:
   pivoting the at least two workpiece spindles around respective axes of rotation for transportation from a grinding position to a loading station and vice versa, wherein the rotation of the two workpiece spindles takes place independently from one another and the two axes of rotation are arranged parallel and at a distance from one another.

2. Method according to claim 1, wherein the two axes of rotation are arranged vertically.

3. Method according to claim 1, wherein for rotation of the workpiece spindles from the grinding position into the loading station and vice versa the same are rotated around the respective axes of rotation by an angle between 180° and 240°.

4. A grinding machine for the grinding of a workpiece comprising at least one tool spindle which can carry at least one grinding tool; at least two workpiece spindles which can at least temporarily be driven to the tool spindle for cooperation of the workpiece with the grinding tool;

wherein the at least two workpiece spindles are arranged pivotable around respective axes of rotation for transportation from a grinding position to a loading station and vice versa, the two axes of rotation are arranged parallel and in a distance to another, and the machine is designed for an independent rotation of the two workpiece spindles.

5. Machine according to claim 4, wherein the two axes of rotation are arranged vertically.

6. Machine according to claim 4, the workpiece spindles depict circular arcs during their rotation around the axis of rotation and the tool spindle is arranged in the area of one of the intersection points of the two circular arcs.

7. Machine according to claim 4, wherein the workpiece spindles depict circular arcs during their rotation around the axis of rotation, and a loading and/or unloading station for the workpieces is arranged in the area of one of the intersection points of the two circular arcs.

8. Machine according to claim 4, wherein a counter support is arranged stationary in the area of the tool spindle on or at a machine bed.

9. Machine according to claim 4, wherein an alignment device for the workpiece and/or a centrifuge station for the workpiece and/or a clamping device changing station and/or a workpiece depositing station is arranged stationary at a position along the circular arc on or at the machine bed.

10. Machine according to claim 4, wherein at one of the two workpiece spindles, a dressing device for the grinding tool is arranged which can be rotated together with the workpiece spindles.

* * * * *